United States Patent
Tomelleri

(10) Patent No.: US 8,328,423 B2
(45) Date of Patent: Dec. 11, 2012

(54) LARGE TELESCOPE ELEVATION STRUCTURE LATERAL HYDROSTATIC GUIDANCE SYSTEM

(76) Inventor: Raffaele Tomelleri, Sommacampagna (IT)

( * ) Notice: Subject to any disclaimer, the term of this patent is extended or adjusted under 35 U.S.C. 154(b) by 301 days.

(21) Appl. No.: 12/821,906

(22) Filed: Jun. 23, 2010

(65) Prior Publication Data
US 2010/0329594 A1 Dec. 30, 2010

(30) Foreign Application Priority Data
Jun. 25, 2009 (IT) .............................. VR2009A0093

(51) Int. Cl.
*F16C 17/06* (2006.01)

(52) U.S. Cl. ...................................... 384/122; 384/308
(58) Field of Classification Search .................... 384/99, 384/122, 303–308
See application file for complete search history.

(56) References Cited

U.S. PATENT DOCUMENTS

| | | | |
|---|---|---|---|
| 3,734,581 A * | 5/1973 | LeBreton ...................... 384/304 |
| 3,994,367 A | 11/1976 | Christ |
| 4,073,549 A * | 2/1978 | Christ et al. ................... 384/122 |
| 4,099,802 A * | 7/1978 | Heinemann et al. ........... 384/122 |
| 4,106,824 A | 8/1978 | Meystre et al. |
| 4,123,666 A | 10/1978 | Miller |
| 4,149,759 A | 4/1979 | Miller |
| 4,544,285 A * | 10/1985 | Shapiro et al. .................. 384/99 |
| 4,892,417 A * | 1/1990 | Spargo et al. ..................... 384/99 |
| 5,869,941 A | 2/1999 | Shiozaki et al. |
| 6,595,691 B1 | 7/2003 | Holopainen et al. |
| 2004/0057642 A1 * | 3/2004 | New .............................. 384/122 |

* cited by examiner

Primary Examiner — Thomas R Hannon
(74) Attorney, Agent, or Firm — Pearne & Gordon LLP

(57) ABSTRACT

Large structure lateral hydrostatic guidance system, particularly suitable for realising the lateral guidance system of the elevation axis of a large telescope made with at least two guide rings, characterized in that all the hydrostatic supports are tilting and floating and have a hydraulic preloading chamber acting between the base and the runner, connected together so as to achieve an isostatic and uniform sharing out of the loads acting on the structure.

6 Claims, 2 Drawing Sheets

LARGE TELESCOPE ELEVATION STRUCTURE LATERAL HYDROSTATIC GUIDANCE SYSTEM

Figure 1:
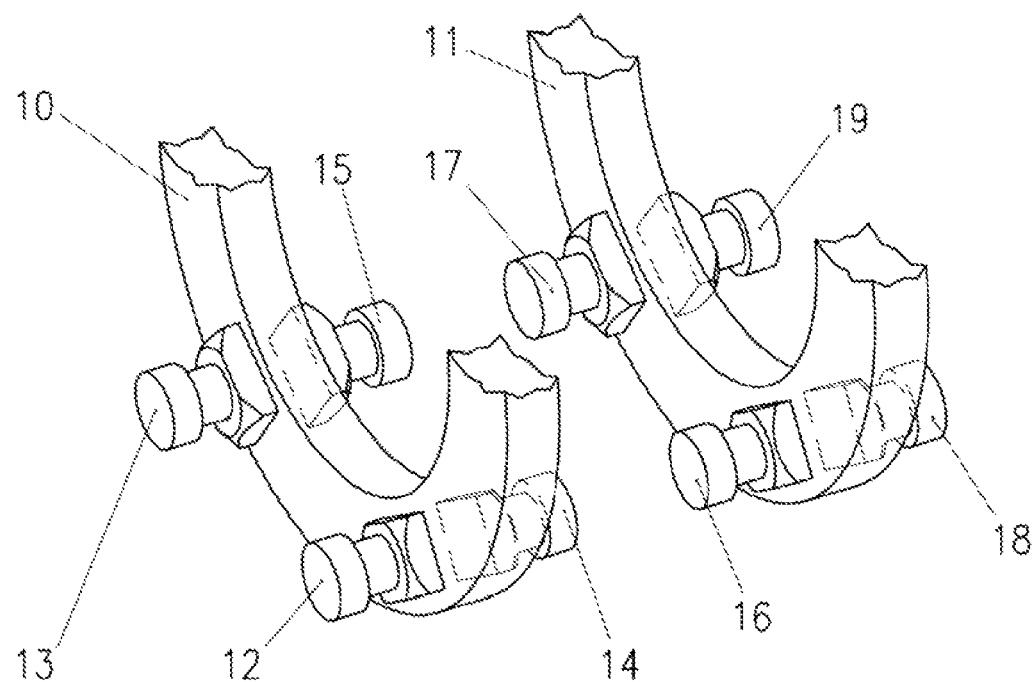

The present invention concerns a lateral hydrostatic guidance system for guiding the movement of large structures, particularly suitable for the lateral guidance of the elevation structure of a large telescope.

The invention can be usefully used in particular when the structure is rotating according to a horizontal axis, called elevation axis, and when the guidance system is made with at least two large rings which, in the case of large telescopes have a particular C-ring shape.

From now on, we shall speak in particular about large telescopes, well aware that the same considerations can be made for other structures for which similar performances are required, such as, for example, large antennas or large machine tools.

A lateral elevation axis hydrostatic guidance system consists of at least four hydrostatic supports coupled with one, two or even more than two guide rings, and its aim is to keep still and rigid the lateral position of the elevation structure, when it rotates and when it is at a standstill, and has the aim of supporting and sharing out the lateral loads among the various hydrostatic supports making it up, placing an oil film between these and the guide rings, so as to allow the rotation movement of the axis with small forces and in the absence of wear.

Let us first of all define the meaning of the following terms:
runner is the part of the hydrostatic support coupled to the guide,
pocket is the recess obtained in the runner, into which the oil is conveyed under pressure through the supply hole,
seeping surface is the surface through which the oil passes from the pocket to the oil recovery channel,
hydrostatic meatus is the oil film between the seeping surface and the guide when the hydrostatic runner is supplied,
tilting in the two directions defines a hydrostatic support the runner of which is able to take up different positions in the two directions,
floating defines a hydrostatic support the runner of which is able to move axially following the stresses coming from the guide, whereby the hydrostatic support, as a result of such stresses, can take on different heights,
master hydrostatic support defines a hydrostatic support that is not floating,
slave hydrostatic support defines a hydrostatic support which is floating.

One of the things the lateral hydrostatic guidance system must be able to do is share out the lateral loads acting on the elevation structure so as to reduce to the utmost the deformations caused to the structure.

The hydrostatic guidance system is required to accept the geometric errors present on the guide rings, both position and positioning, caused both by construction errors and deformations produced by heat expansions, so as not to produce overloads on the structure and on the hydrostatic supports during the rotation of the elevation axis.

In order to accept the positioning errors of the guide rings it is furthermore necessary for the hydrostatic supports to be able to tilt, i.e., to take on different angles, in the two directions, to adapt to the guide surface during rotation.

In the case of applications requiring high precisions, such as that of telescopes, the behaviour of the hydrostatic supports must also be without stick-slip phenomena as could occur in the case of friction couplings being adopted inside it, present for example when ball joints are used.

The hydrostatic supports are also required to be able to share out the lateral load in an acceptable way, including when there is a power supply break and in the presence of earthquakes.

The lateral hydrostatic guidance systems of the structures currently used employ one or more master hydrostatic supports, which are of fixed height and which are therefore statically rigid, and several slave hydrostatic supports, which are instead floating, i.e., have variable height which therefore adapts to the position of the guide.

These systems do not allow obtaining a high lateral static and dynamic rigidity, and do not achieve a good sharing out of the load among the hydrostatic supports in the presence of large geometric errors affecting the guide rings, without causing static or transitory loads on the structure.

The main object of the present invention is to achieve a better sharing out of the lateral loads among the hydrostatic supports, including in the presence of large guide ring errors.

A further object of the invention is to achieve a high static and dynamic rigidity of the hydrostatic guidance system.

A further object of the present invention is to ensure an operation without inside sliding couplings.

A further object of the present invention is to also keep the structure in central position even in the presence of major changes in the distance between the lateral guides.

These objects, like others resulting from the following description are achieved, according to the invention, with a system of hydrostatic support for the lateral guide characterised in that:
all the hydrostatic supports are of the tilting and floating type without ball joint,
all the hydrostatic supports have hydraulic chamber,
all the hydraulic chambers of the hydrostatic reaction supports are connected the one to the other,
all the hydraulic chambers of the hydrostatic preloading supports are connected the one to the other and supplied by the preloading pressure,
all the connections towards the hydraulic chambers, both those of the hydrostatic reaction supports and those of the hydrostatic preloading supports, are made by means of a hydraulic damping resistance,
the hydraulic damping resistances have low enough values to allow the slow movements produced by the heat expansions and by the geometric errors, but high enough to obtain a high dynamic rigidity of the hydrostatic supports.

Figure 2:
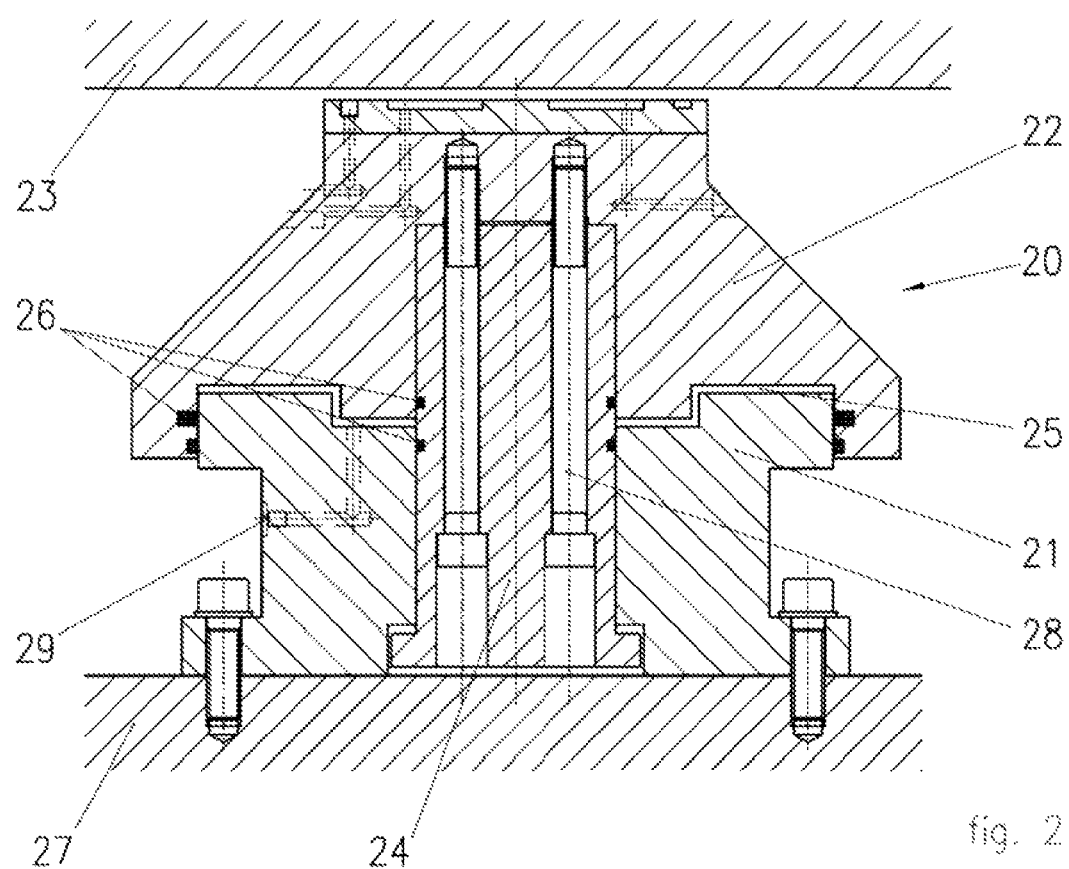
Figure 3:
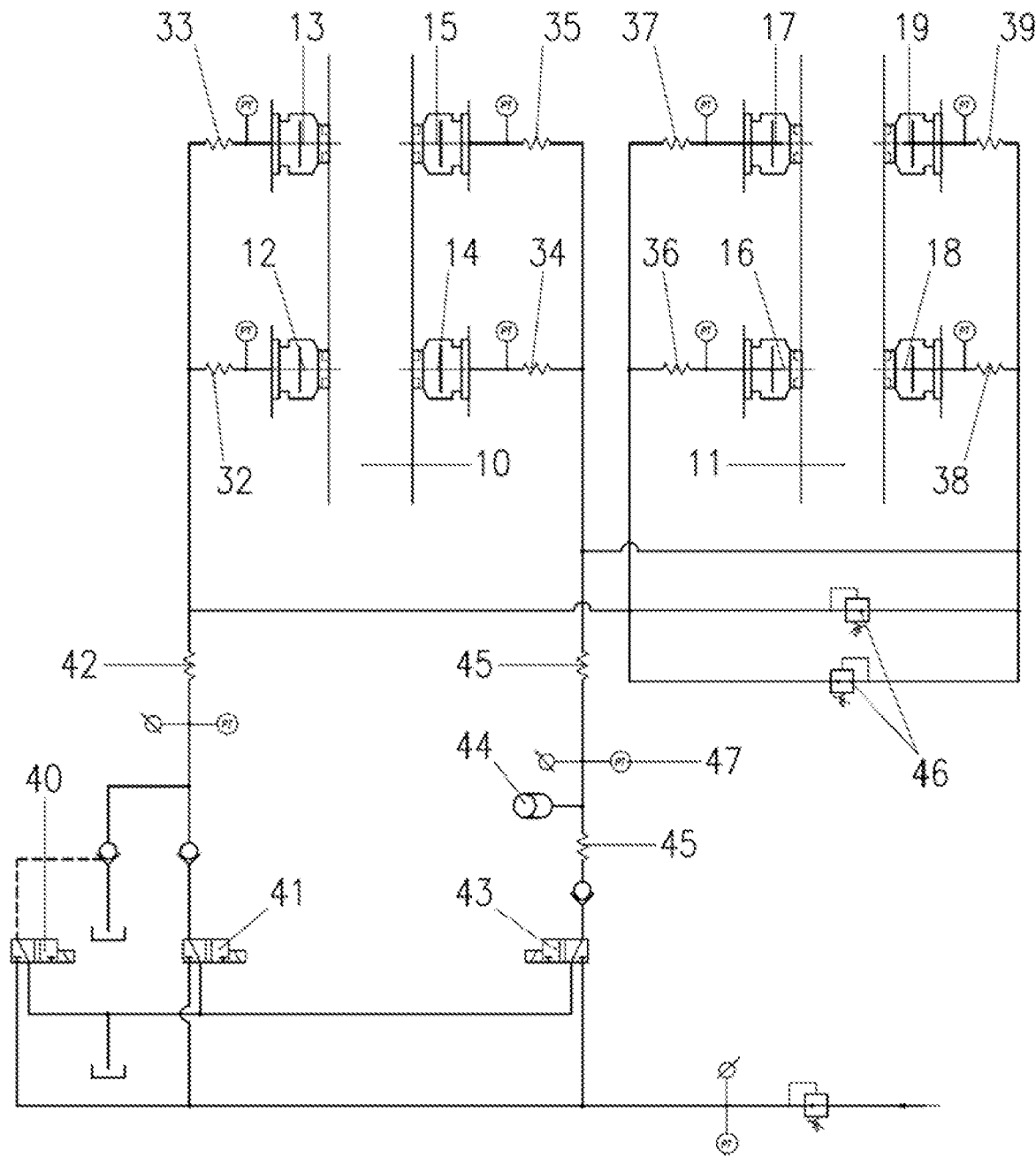

The present invention is herein below further explained in some preferred practical embodiments, shown merely by way of example and without any intention of being exhaustive, with reference to the attached drawing plates, wherein:
the FIG. 1 schematically shows a lateral hydrostatic guidance system with two guide rings and eight hydrostatic supports
the FIG. 2 schematically shows a section of a hydrostatic support.
the FIG. 3 schematically shows the hydraulic connection diagram between the hydraulic chambers of the hydrostatic supports.

The FIG. 1 shows the two guide rings 10 and 11 to which is integral the elevation structure, which is not shown, to which are coupled eight hydrostatic supports 12, 13, 14, 15, 16, 17, 18, 19 resting on the support structure which is called azimuth in the antennas and in the telescopes, which is not shown either.

The supports 12 and 13 are fitted on the left side of the left guide ring, the hydrostatic supports 14 and 15 are fitted on the right side of the left guide ring, the supports 16 and 17 are fitted on the left side of the right guide ring, the hydrostatic supports 18 and 19 are fitted on the right side of the right guide ring.

In the illustrations, the azimuth and elevation structures are not shown to avoid drawing superimpositions and make this clearer.

The FIG. 2 shows the hydrostatic support 20 mainly consisting of the base 21 and of the runner 22 which is hydrostatically coupled to the lateral surface of the guide ring 23. The coupling of the runner to the lateral guide is by means of at least four pockets supplied through laminar resistances so as to determine the hydrostatic meatus of the desired height, and this according to known methods.

The runner 22 is fastened to the restraining shaft 24 by means of the screws 28 which do not restrain it to the base 21 and the runner is thus floating, i.e., able to translate axially in relation to the base which is fastened to the azimuth structure 27.

The hydrostatic support shown is tilting and floating.

The dimensions of the restraining shaft 24 are such as to allow it to bend as a result of a different positioning of the guide ring in relation to the support, and consequently it does in fact make the runner tilting in the two directions.

The hydraulic chamber 25 placed between the base 21 and the runner 22, is supplied through the hole 29 from which the oil can enter or exit, determining the floating movement of the runner within the allowed stroke. The seal of the hydraulic chamber is obtained by means of the seals 26.

The coupling length between runner and base in correspondence to the external seal 26 is short enough to allow the runner to tilt by large enough angles, but which do not determine interferences.

The FIG. 3 shows two lateral guide rings 10 and 11 and how the hydraulic connections are made to the hydraulic chambers of the hydrostatic supports 12, 13, 14, 15, 16, 17, 18, 19.

The hydraulic chambers of the hydrostatic supports 12, 13, 16, 17, located on the left side of the guide rings, are connected together by means of the resistances 32, 33, 36, 37, and supplied by means of the solenoid valve 41 to introduce oil and by means of the solenoid valve 40 to allow the oil to exit, and this with a flow that is restricted by the resistance 42.

The hydraulic chambers of the hydrostatic supports 14, 15, 18, 19, located on the right side of the guide rings, are connected together by means of the resistances 34, 35, 38, 39, and supplied by means of the solenoid valve 43 which charges the accumulator 44 by means of the supply resistance 46 at the preloading pressure which is controlled by means of the pressure transducer 47. Other pressure transducers indicated by the code PT are made ready to measure and control the pressures present.

The pressure present in the accumulator 44 corresponds to the pressure also created inside all the hydraulic chambers connected to it by means of the resistances, when there are no external loads acting against the guide rings.

The right hydrostatic supports are called preloading supports because they produce a preloading action against the right side of the guide rings according to the pressure present in the accumulator, while the left hydrostatic supports are hydrostatic reaction supports because they rigidly maintain their position, and in their hydraulic chambers a pressure is produced determined by the balances of the acting forces.

In the event of there being no external forces acting on the elevation structure, the pressure in the hydraulic chambers of the hydrostatic reaction supports reaches a value identical to that of the hydraulic chambers of the hydrostatic preloading supports.

In the event instead of there being an external force acting on the elevation structure, e.g., from right to left, the pressure in the hydraulic chambers of the hydrostatic reaction supports reaches a value identical to the sum of the pressure of the hydraulic chambers of the hydrostatic preloading supports plus the pressure needed to contrast the external force load. In any case, the external force is contrasted just the same by the four hydrostatic supports due to the fact that their hydraulic chambers are connected the one to the other.

The function of the solenoid valves 40 and 41 is to introduce or allow to escape through the resistance 42, the required quantity of oil from the hydraulic chambers of the hydrostatic reaction supports, thereby causing the movement to the right or to the left of the elevation structure in relation to the azimuth structure.

The hydraulic damping resistances 32, 33, 34, 35, 36, 37, 38 and 39, which supply the hydraulic chambers of the hydrostatic reaction supports have a value high enough not to allow the flow of oil in relation to the rapidity of the dynamic stresses determined by the operating systems and the disturbance forces, and consequently the hydrostatic supports, from a dynamic viewpoint, behave as if they had fixed height, and thus considerably contribute to the dynamic rigidity of the structure plus hydrostatic supports assembly.

The dynamic rigidity of each single hydrostatic preloading and reaction support is very high because the hydraulic chamber has an extensive surface and a very low height, in the region of just a few millimeters.

The hydraulic damping resistances on the other hand have a value low enough to allow the slow movement of adaptation of the axial position of the runners so these can follow the slow changes in height determined by the geometric errors or by the deformations produced by the heat expansions.

Another function of the hydraulic damping resistances is to separate the volume of the hydraulic chamber from the volume of the connection pipes, which can have a small diameter but are very long, increasing the dynamic rigidity of the chamber itself.

The static rigidity of each single hydrostatic preloading support is nil, while the lateral static rigidity of the entire elevation structure is high considering the sum of the oil volumes present in the four hydraulic chambers of the hydrostatic reaction supports is constant. This until the solenoid valves 40 and 41 are supplied to move the elevation structure sideways.

In case of increase in the distance between the two guide rings due to a heat expansion or to an increase in the distance during the rotation due to the geometric errors, the oil flows from the hydraulic chambers of the hydrostatic supports 12 and 13 towards the hydraulic chambers of the hydrostatic supports 16 and 17, and at the same time the oil flows from the chambers of the hydrostatic supports 18 and 19 towards the hydraulic chambers of the hydrostatic supports 14 and 15.

In case on the other hand of an increase in thickness of one or both the two guide rings during the rotation due to geometric errors, the oil flows from the hydraulic chambers of the supports 14, 15, 18, 19 towards the accumulator 44 through the supply resistance of the preload 45, or vice versa in the case of the reduction in thickness of one or both the guide rings.

The supply resistance of the preload 45 can be very high inasmuch as the changes in thickness of the guide rings during the rotation are very small and so we can speak of almost static behaviour. If the variation errors of the thickness of the guide rings are very small, the accumulator 44 and the supply resistance 45 could be removed, but this would cause possible variations in the preloading force due to small oil leaks or to the heat expansion of the oil.

For this reason, it is best to keep the connection of the supply preloading group at constant pressure, with or without the accumulator, by means of a supply resistance with very high value in order to have an almost static behaviour of the preloading group, but thereby guaranteeing the maintaining of the preloading force value. Consider that the variation in thickness of the guides is that resulting from the average between the four positions on the guide and can therefore be very small.

The maximum pressure valves 46 operate in case of an earthquake event to limit the maximum pressure in the hydraulic chambers so that, in this case, the valve setting having been exceeded, the oil can flow between the hydraulic chambers of the left-side hydraulic supports towards the hydraulic chambers of the hydrostatic supports located on the right side, determining a movement of the structure to an extent allowed by the hydraulic chambers of the supports.

This, besides protecting the hydrostatic supports, also determines the absorption of a certain quantity of energy.

A different lateral hydrostatic guidance system can be obtained by adopting a larger number of guide rings, e.g., four, or a larger number of hydrostatic supports coupled with the guide rings, e.g., three.

In this case, a behaviour is obtained similar to that presented, only in this case, all the hydraulic chambers of the hydrostatic supports fitted on the right side of the guide rings must be connected the one to the other, and all the hydraulic chambers of the hydrostatic supports fitted on the left side of the guide rings are similarly connected together. In this case as well, each external load is shared out at running speed between all the hydrostatic supports on the one side, while each change of distance between the guide rings causes the oil to flow between the hydraulic chambers of the hydraulic supports of each of the two groups, keeping unchanged the average point between all the hydrostatic supports.

Even with four guide rings, if the changes in thickness of the guide rings are small enough, a very large supply resistance of the preload can be adopted to make the behaviour of the preloading group practically static while at the same time keeping the preloading pressure constant.

The present invention has been illustrated and described in some of its preferred embodiments, but of course executive variations can in point of fact be made to it, without because of this exiting from the protection scope of the present patent for industrial invention.

The invention claimed is:

1. Large structure lateral hydrostatic guidance system for realising the lateral guidance system of the elevation axis of a large telescope made with at least two guide rings, characterised in that:
   it comprises hydrostatic supports each comprising a base and a runner which is hydrostatically coupled to a lateral surface of the guide ring; each hydrostatic support comprising an hydraulic chamber acting between the base and the runner,
   the runner is fastened to a restraining shaft which is connected to the base in an unrestrained way so that the runner is able to translate axially in relation to the base; the hydraulic chamber is supplied through a hole from which oil can enter or exit determining a floating movement of the runner in such a way that all the hydrostatic supports are tilting and floating and no ball joint is present in them,
   the hydrostatic supports are split into two groups, a preloading group and a reaction group; the hydrostatic supports of the preloading group being located on one side of the guide rings and the hydrostatic supports of the reaction group being located on the other side of the guide rings; the hydraulic chambers of the hydrostatic preloading supports being supplied at a preloading pressure,
   all the hydraulic chambers of the hydrostatic supports of the reaction group are connected the one to another,
   one or more supply resistances exist of the hydraulic chambers of the preloading group which has a value low enough to allow the slow variations in thickness of the guide rings, but high enough to obtain a high lateral dynamic rigidity of the lateral hydrostatic guidance system.

2. Lateral hydrostatic guidance system according to claim 1 characterised in that the supply to the hydraulic chambers of the hydrostatic preloading supports is achieved by means of one or more hydraulic damping resistances.

3. Lateral hydrostatic guidance system according to claim 1 characterised in that the hydraulic chambers of the hydrostatic reaction supports are connected one to another by connections made by means of one or more hydraulic damping resistances.

4. Lateral hydrostatic guidance system according to claim 1 characterised in that the hydraulic chambers of the hydrostatic reaction supports are connected by means of a hydraulic damping resistance and the hydraulic chambers of the hydrostatic preloading supports are connected by means of a hydraulic damping resistance; the hydraulic damping resistances of the preloading group and of the reaction group having a value low enough to allow the slow lateral variations of position in correspondence to each hydrostatic support, but high enough to obtain a high dynamic rigidity of each hydrostatic support.

5. Lateral hydrostatic guidance system according to claim 1 characterised in that maximum pressure valves exist connecting a supply of the hydraulic chambers of the hydrostatic reaction supports to a supply of the hydraulic chambers of the hydrostatic preloading supports.

6. Lateral hydrostatic guidance system according to claim 1 characterised in that the hydrostatic reaction supports are supplied by solenoid valves so as to allow a lateral movement of the axis.

* * * * *